Jan. 17, 1950

W. E. WINTERHALTER ET AL 2,494,852

ELECTRIC CONTROL

Filed Sept. 26, 1945

Inventors:
WILLIAM E. WINTERHALTER
and EDWIN E. VONADA,
by: Donald G. Dalton
their Attorney.

Patented Jan. 17, 1950

2,494,852

UNITED STATES PATENT OFFICE 2,494,852

ELECTRIC CONTROL

William E. Winterhalter, Coshocton, Ohio, and Edwin E. Vonada, McKeesport, Pa.

Application September 26, 1945, Serial No. 618,664

4 Claims. (Cl. 204—211)

This invention relates to an electric control and primarily to the control of the low voltage high current system which is used in maintaining the ratio of plating current to speed necessary for producing uniform coating thicknesses in variable speed electroplating processes. Electrolytic tin strip is ordinarily produced in a continuous processing line where the speed of the strip varies and this makes it necessary to change the current density in synchronism with changes in speed of strip travel so that the weight of deposited tin can be held constant. During constant speed operation the current density will vary due to differences in the temperature of the electrolyte, anode corrosion and electrode spacing variations caused by imperfect strip shape. Various means have been used to control the plating current in accordance with changes in strip speed but such controls have not proved entirely satisfactory.

In this and other controls it is necessary to provide a circuit for impressing upon a field a voltage proportional to the current or voltage to be controlled. Such circuits now in use have not proved satisfactory for all values of currents and voltages which are to be controlled.

It is an object of this invention to provide a control which will permit accurate control of the weight of coating on the strip.

Another object is to provide a pickup circuit which is adapted for use in the control of our invention.

Still another object is to provide a pickup circuit which is adapted for use in controlling the current of high or low D. C. current and voltage systems.

These and other objects will be more apparent after referring to the following specification and attached drawings in which.

Figure 1:
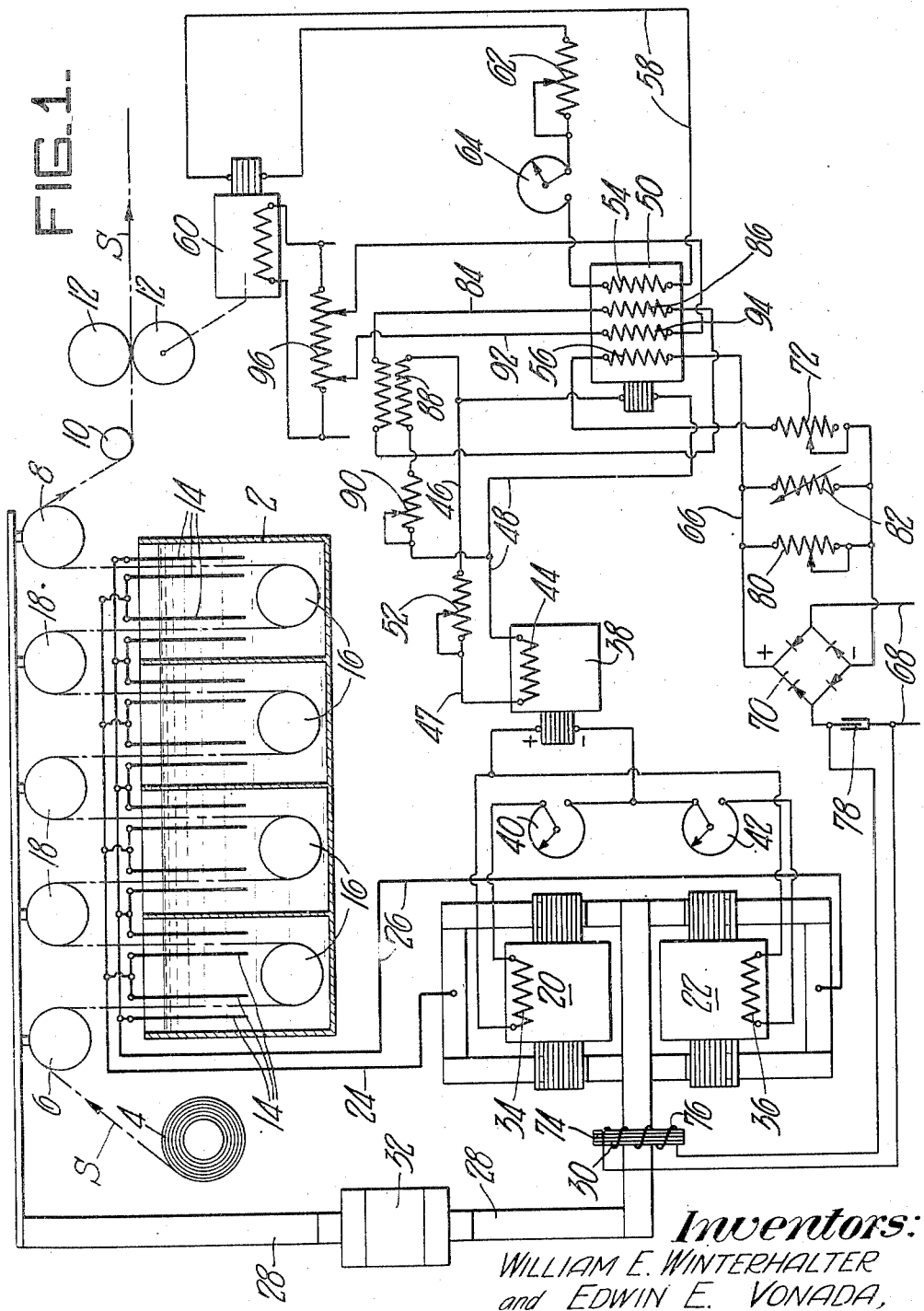
Figure 1 is a schematic view showing the control applied to the electrotinning apparatus.

Referring more particularly to the drawings, the reference numeral 2 indicates a plating tank which contains a suitable electrolyte. The strip S passes from an uncoiler 4 over conductor roll 6 and thence into the tank 2, and passes out of the tank over a conductor roll 8 from which it is directed by means of a billy roll 10 into the driven puller rolls 12. As the strip passes through the tank, it is directed between anodes 14 by means of sink rolls 16 and conductor rolls 18. Plating current is supplied to the plating tank from a top plating generator 20 and a bottom plating generator 22. The positive terminal of generator 20 is connected to a positive bus bar 24 which is connected to the anodes 14 which act upon the top of the strip. Generator 22 is connected in like manner to a positive bus bar 26 which is connected to the anodes 14 acting upon the bottom of the strip. The generators 20 and 22 have common negative connections and are connected to the negative bus bar 28 which is connected to the conductor rolls 6, 8 and 18.

A saturable core reactor 30 is installed around the negative bus 28 for a purpose which will be described later. A shunt 32 is also installed in the negative bus for measuring the total plating current and for the control purpose described hereinafter.

Field 34 of generator 20, and field 36 of generator 22, are connected in parallel across the armature of a plating exciter 38 and are provided with hand operated rheostats 40 and 42 connected in series with the respective fields to provide top and bottom current density balance. The apparatus described above is standard equipment with the exception of reactor 30 and shunt 32. These are used in the control of our invention which exercises supervision over the armature voltage of the plating exciter 38 by varying its field 44. The excitation circuit 46, 47 and 48 of the exciter 38 is connected across the armature or output circuit of a single unit amplifying exciter 50 through a current limiting resistor 52. The exciter 50 may be of the type known as the "Amplidyne" which is provided with a plurality of field circuits wound on common pole pieces. The armature or output voltage of the exciter 50 is principally derived from and controlled by two of these fields 54 and 56.

Field 54 is in the basic control circuit 58 which is connected to produce a positive flux which increases the output voltage of exciter 50 and consequently the plating current as the line speed increases. A tachometer generator 60 connected to be driven by rolls 12 is located in this circuit and the output voltage of the generator is applied to field 54 through a current limiting resistor 62 and a manually operated rheostat 64. This rheostat is used to accommodate plating current requirements when product schedule changes in electrode areas and coating weight occur. The tachometer generator 60 has the usual straight line speed voltage relationship.

Field 56 produces a restraining flux which is proportional to the total plating current and is in opposition to that of the basic control field 54. The field 56 is energized from a 110 volt A. C. source 68 through a pickup circuit 66 comprising a saturable core reactor 30, full wave rectifier 70 and resistance 72. The saturable core reactor 30 is constructed by surrounding the negative bus 28 with a closed magnetic circuit of laminated silicon steel 74. An insulated 1450 turn coil 76 is wound on this magnetic core and is connected to one side of the 110 volt supply and rectifier 70. The reactor 30 is designed and constructed so that with zero current flow in the negative bus 28 the impedance of the coil 76 will limit the current through field 56 to a very low value. When current flows in the negative conductor, a saturating flux is produced in the core 74 which decreases its effective permeability which in turn decreases the inductive reactance of coil 76, thereby increasing the current in field 56. Small changes in plating current produce opposite changes in the reactance of coil 76 which in turn causes the current through field 56 to vary with changes in plating current. Since this field is in opposition to basic control field 54, the output voltage of exciter 50 varies inversely as the plating current changes and will cause the plating generators 20 and 22 to correct the current change. A condenser 78 may be used across coil 76 for power factor and wave form variation, or in other words, for adjustment of strip speed-plating current characteristic shape. A resistor 80 is connected across the D. C. terminals of rectifier 70 to load up the reactor so that regulation will occur on the straight line portion of the saturable core reactor saturating current impedance curve. An automatically variable by-pass resistor 82, such as the General Electric "Control Thyrite," is connected in parallel with resistance 80 and provides additional means for varying the speed-plating current relation to any desired correction. Resistance 72 is adjusted to limit the current in circuit 66.

When the line speed is increased or when other changes are taking place, the output voltage of exciter 50 increases rapidly due to increased excitation from field 54 which is not immediately restrained by field 56. Likewise, when the line speed is decreased, the output voltage of exciter 50 decreases rapidly due to the decrease of excitation from field 54 which causes an immediate excess of current in field 56. These rapid changes cause a fluctuating of the control as it seeks to establish the desired relationship between line speed and plating current. In order to effect a smooth transition to steady conditions from the transient conditions in which high forcing power has been applied by the exciter 50 to the exciter 38, a stabilizing circuit 84 having field 86 therein is connected across the exciter 50 through direct current impulse transformer 88. A resistance 90 is employed in the line to adjust the magnitude of the secondary impulse from the transformer 88 to effect the stabilization desired. The polarity connections of field 86 are such that the rapid increase of the output voltage from exciter 50 induces a delayed D. C. impulse voltage in the secondary of transformer 88 which is applied to circuit 84 in opposition to the increased total excitation of exciter 50 and tapers the output voltage to the steady conditions after the desired ratio of line speed and plating current has been established. In like manner, a delayed D. C. impulse voltage having a polarity opposite to that associated with line acceleration is induced in the secondary of transformer 88 which is applied to circuit 84 when there is rapid deceleration and this brings the output voltage of exciter 50 back to the steady conditions after the desired ratio between line speed and plating current has been established.

In order to compensate for the small leakage excitation of circuit 66 when there is no excitation in circuit 58, circuit 92 having field 94 therein is provided for exciter 50. The leakage current in circuit 66 overcompensates the normal residual voltage of exciter 50, exciter 38, and generators 20 and 22 and causes reverse plating current to flow. That is, the strip S will become anodic and will be subject to anodic corrosion. To prevent this anodic corrosion, field 94 is energized from a source of constant D. C. voltage and the desired amount of correction is obtained by adjusting the taps of resistor 96 so that the plating current is adjusted to zero where it will remain until circuit 58 is energized. The flux of field 94 opposes that of field 56, but is so small that its effect is negligible when the line is in operation.

When the line is operating at a particular speed with the plating current constant, the adjusted algebraic summation ratio of control fields 54, 56 and 94 determine the output of exciter 50. The exciter 50 has an amplification factor of from 1,000 to 10,000 and the algebraic summation of voltage is therefore .1% to .01% of the output voltage of exciter 50. Assuming that this output voltage is 100 under steady conditions, the algebraic summation of excitation voltages would be .02 volt for a regulator having an amplification factor of 5,000. Typical control voltages supplied to field 56 is .5 to 5 volts and to field 54 is 2.5 to 25 volts when the line is moving at 10% to 100% of normal line speed. It is therefore evident that the algebraic summation of excitation voltages is only a small percentage of the voltages applied to the control circuits of exciter 50. A .02% variation in line speed or a .1% variation in plating current would cause a departure of .005 volt from the adjusted algebraic summation ratio which would result in a 25 volt change in the output of exciter 50 to the field 44 of plating exciter 38. Since the rate of change would be approximately 2,000 volts per second, this change would, in addition to forcing the plating generators 20 and 22 to meet the new requirements, supply a D. C. impulse to control circuit 84 to taper this forcing to termination when the adjusted algebraic summation ratio of exciter 50 control circuits has been re-established.

When the line speed increases, the speed of tachometer generator 60 is also increased, thus increasing its output voltage. This increases the flux of field 54 thus causing an unbalance of flux ratio produced by fields 54 and 56. This causes a rapid increase in output voltage of exciter 50 which is not immediately restrained by field 56. This in turn induces a delayed D. C. voltage in the secondary of transformer 88, which is applied to field 86 in opposition to the increased total excitation of exciter 50 and tapers the output voltage to steady conditions after the desired ratio of line speed and plating current has been established. The increased output of exciter 50 is supplied to the field of exciter 38, thus increasing the output of generators 20 and 22. This changes the impedance of coil 76 which increases the flux of field 56 to establish a new relationship between fluxes produced by fields 54 and 56 to provide the necessary increase in total flux. When the line speed decreases, the flux produced by field 56 will be proportionately greater than that produced by field 54 and the output of exciter 50 will be decreased, thus changing the output of exciter 38 which in turn changes the output of generators 20 and 22. This changes the impedance of coil 76 which decreases the flux of field 56 to establish a new relationship between the fluxes produced by fields 54 and 56 to provide the necessary decrease in total flux.

Figure 2:
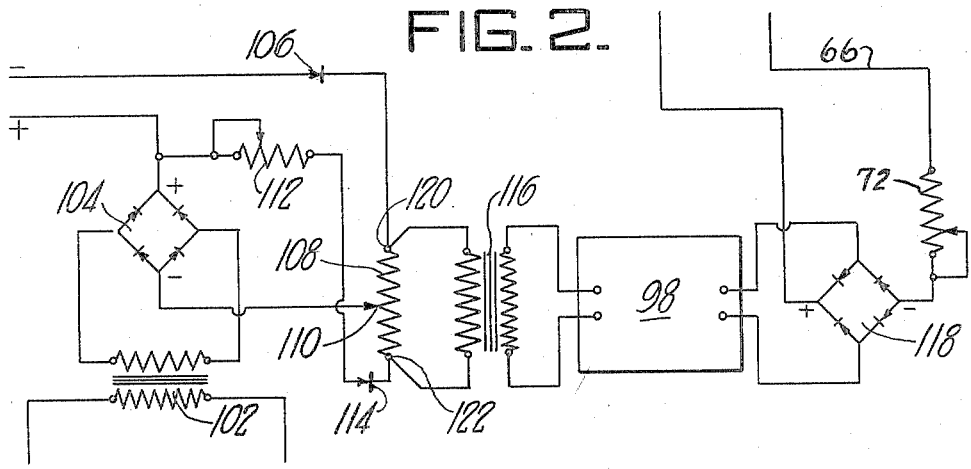
Figure 2 is a schematic wiring diagram of a second circuit for obtaining the restraint voltage.

Figure 2 discloses a second method of obtaining the restraint voltage. In this embodiment the voltage drop across the plating current negative conductor shunt 32 is used for varying the excitation of field 56. The low shunt voltage is amplified to the desired regulating system voltage by means of an A. C. electronic amplifier 98. An A. C. amplifier is used because the inherent instability of a D. C. electronic amplifier is objectionable. This pickup circuit will be described with reference to a special application in which a 110 volts, 60 cycle power supply is transformed to 2.5 volts by means of transformer 102. A full wave rectifier 104 converts the 60 cycle sine wave to 120 unidirectional impulses per second. Two circuits emanate from the positive terminal of rectifier 104. The current of one circuit passes through the shunt 32, a half wave rectifier 106 through voltage divider 108 to the center tap 110, and thence to the negative terminal of rectifier 104. The current of the other circuit passes through resistor 112, half wave rectifier 114 through voltage divider 108 to the center tap 110 and thence to the negative terminal of rectifier 104. The half wave rectifiers 106 and 114 are constructed to afford very low resistance to current flow in the direction described above, but will provide the usual blocking of any current tending to flow in the opposite direction. This prevents the current caused by the shunt millivolts from flowing through the circuit comprising rectifier 106, voltage divider 108, rectifier 114, resistance 112 and back to the negative terminal of the shunt. The low impedance winding of a bridging input transformer 116 is connected across voltage divider 108 and couples the carrier to amplifier 98. The pulsating unidirectional input voltage is greatly amplified by amplifier 98 and is converted into a pulsating unidirectional voltage by rectifier 118 before it is impressed on field 56. With no plating current, resistor 112 is adjusted until the voltage between points 120 and 122 of voltage divider 108 is zero. In such case, the voltage wave form is that shown at A in Figure 3. When plating current through the shunt is raised to 50% of the shunt rating, the wave form of the voltage across 120 and 122 will be as shown at B in Figure 3 with the polarity of the shunt leads as shown. The magnitude of this voltage will be equal to the millivolts and exists as pictured because the instantaneous voltage at 120 at zero time is below that at 122 by an amount equal to the shunt millivolts. The maximum voltage is reached when the instantaneous voltage at 120 reaches the zero axis. This maximum voltage is maintained until the instantaneous voltage at 120 again crosses the zero axis. The negative maximum voltage is again reached when the instantaneous voltage at 122 reaches zero. If the plating current is increased to 100% of the shunt rating, the wave form of the voltage between 120 and 122 assumes the shape shown at C in Figure 3. The increased magnitude of this wave causes a linear increase in the output voltage of amplifier 98.

Figure 3:
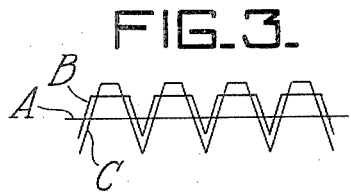
Figure 3 shows the wave form of the voltage across the voltage divider of Figure 2.
Figure 4:
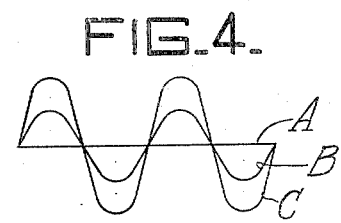
Figure 4 shows the output wave form of the audio-amplifier of Figure 2.
Figure 5:
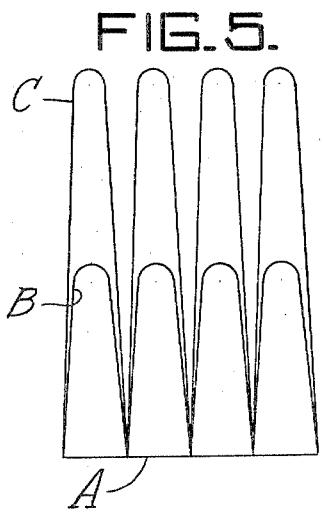
Figure 5 shows the wave form of the rectified current of Figure 4.
Figure 6:
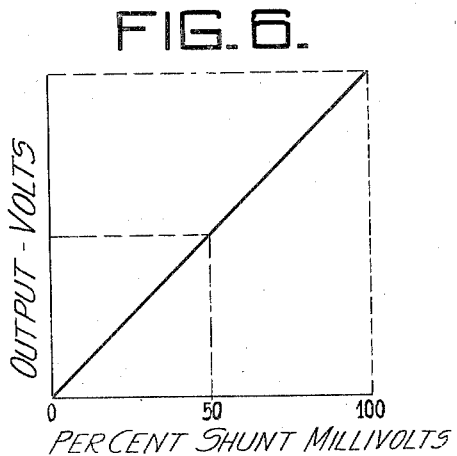
Figure 6 is a curve showing the relationship between the shunt millivolts and the voltage output of the current limiting circuit.

The approximate audio-amplifier output wave forms for the various input wave forms shown in Figure 3 are shown at A, B and C of Figure 4. The corresponding amplified wave form after rectification is shown at A, B and C of Figure 5 and the relationship between the shunt millivolts and the voltage impressed on field 56 is shown in Figure 6.

Since this circuit initially depends only on millivolt variations for its operation, the regulating control system can be adapted to the current control of high or low D. C. current and voltage systems, while the corresponding control shown in Figure 1 is adaptable only to high D. C. current systems. The operation of the control is otherwise the same as that described for Figure 1.

While electrodeposition of tin on steel strip has been employed to illustrate the control and circuits described, it is evident that they are applicable generally to accurate continuously supervised current regulation of direct current machines without use of mechanical or other contact devices, excepting for protection.

While two embodiments of the invention have been shown and described, it will be apparent that other adaptations and modifications may be made without departing from the scope of the following claims.

We claim:

1. A pickup and control circuit comprising a saturable core reactor having a core and a coil thereon, a direct current circuit coupled to said core for controlling the reactance of said coil, means for connecting an alternating current source to said coil, a full wave rectifier connected to said alternating current source, said coil being in the alternating current circuit of the rectifier, a condenser connected across said coil, a control field connected across the direct current terminals of said rectifier, a resistor in said last named connection for loading up the reactor, and a by-pass resistor automatically variable in response to voltage across said control field circuit, said by-pass resistor being connected in parallel with said first named resistor, said condenser and resistances being proportioned to produce a linear result in the control field circuit.

2. Apparatus for electrically treating metal strip having an electrolyte therein, said apparatus including means for passing the strip through said electrolyte at a varying speed, an electric circuit including said strip and said electrolyte, electric powering means for supplying direct current to said circuit, a bus bar connected between said powering means and the strip, an amplifying exciter for varying the output of said powering means, a pair of fields for controlling the output voltage of said exciter, a saturable core reactor having a core surrounding said bus bar and a coil wound on said core, the current flowing in said bus bar controlling the reactance of said coil, a full wave rectifier connected to an alternating current source and to said coil, a condenser connected across said coil, one of said control fields being connected across the direct current terminals of said rectifier, a resistor in said last named connection for loading up the reactor, a by-pass resistor automatically variable in response to voltage across said control field circuit, said by-pass resistor being connected in parallel with said first named resistor, said condenser and resistances being proportioned to produce a linear result in the control field circuit, means for producing a voltage proportional to line speed, and means for applying said last named voltage to the other of said fields to produce a flux in opposition to the flux of the first field.

3. Apparatus for electrically treating metal strip having an electrolyte therein, said apparatus including means for passing the strip through said electrolyte at a varying speed, an electric circuit including said strip and said electrolyte, electric powering means for supplying direct current to said circuit, a bus bar connected between said powering means and the strip, an amplifying exciter for varying the output of said powering means, a pair of fields for controlling the output voltage of said exciter, a saturable core reactor having a core surrounding said bus bar and a coil wound on said core, the current flowing in said bus bar controlling the reactance of said coil, a full wave rectifier connected to an alternating current source and to said coil, a condenser connected across said coil, one of said control fields being connected across the direct current terminals of said rectifier, a resistor in said last named connection for loading up the reactor, a by-pass resistor automatically variable in response to voltage across said control field circuit, said by-pass resistor being connected in parallel with said first named resistor, said condenser and resistances being proportioned to produce a linear result in the control field circuit, means for producing a voltage proportional to line speed, means for applying said last named voltage to the other of said fields to produce a flux in opposition to the flux of the first field, and a third field for said exciter for producing a flux to counteract the leakage excitation of the circuit of the first named field when there is no excitation in the circuit of the second named field.

4. A system for regulating the current output of a generator connected to a load including a moving metal strip, which system comprises a bus bar connected between the generator and the strip, an amplifying exciter for varying the output of said generator, a pair of fields for controlling the output voltage of said exciter, a saturable core reactor having a core surrounding said bus bar and a coil wound on said core, the current flowing in said bus bar controlling the reactance of said coil, a full wave rectifier, means for connecting an alternating current source to said rectifier and to said coil, a condenser connected across said coil, one of said control fields being connected across the direct current terminals of said rectifier, a resistor in said last named connection for loading up the reactor, a by-pass resistor automatically variable in response to voltage across said control field circuit, said by-pass resistor being connected in parallel with said first named resistor, said condenser and resistances being proportioned to produce a linear result in the control field circuit, means for producing a voltage proportional to strip speed, and means for applying said last named voltage to the other of said fields to produce a flux in opposition to the flux of the first field.

WILLIAM E. WINTERHALTER.
EDWIN E. VONADA.

REFERENCES CITED

The following references are of record in the file of this patent:

UNITED STATES PATENTS

| Number | Name | Date |
|---|---|---|
| 2,019,352 | Livingston | Oct. 29, 1935 |
| 2,278,151 | Runaldue | Mar. 31, 1942 |
| 2,325,401 | Hurlston | July 27, 1943 |
| 2,374,012 | Hanna | Apr. 17, 1945 |
| 2,374,199 | Harris | Apr. 24, 1945 |
| 2,404,948 | Croco | July 30, 1946 |
| 2,455,997 | Holman | Dec. 14, 1948 |
| 2,465,254 | Edwards | Mar. 1, 1949 |